(12) United States Patent
Mao et al.

(10) Patent No.: US 10,008,894 B2
(45) Date of Patent: Jun. 26, 2018

(54) DOUBLE RESONANCE VIBRATION MOTOR

(71) Applicants: Lubin Mao, Shenzhen (CN); Fei Hou, Shenzhen (CN)

(72) Inventors: Lubin Mao, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 229 days.

(21) Appl. No.: 15/228,196

(22) Filed: Aug. 4, 2016

(65) Prior Publication Data

US 2017/0110920 A1    Apr. 20, 2017

(30) Foreign Application Priority Data

Oct. 15, 2015    (CN) .................... 2015 2 0797690 U

(51) Int. Cl.

| | |
|---|---|
| *H02K 33/16* | (2006.01) |
| *H02K 33/00* | (2006.01) |
| *H02K 1/34* | (2006.01) |
| *H02K 3/46* | (2006.01) |
| *H02K 5/04* | (2006.01) |
| *H02K 7/02* | (2006.01) |
| *B06B 1/04* | (2006.01) |

(52) U.S. Cl.
CPC ................. *H02K 1/34* (2013.01); *H02K 3/46* (2013.01); *H02K 5/04* (2013.01); *H02K 7/02* (2013.01); *H02K 33/16* (2013.01); *B06B 1/045* (2013.01); *H02K 33/00* (2013.01)

(58) Field of Classification Search
CPC ........ H02K 33/00; H02K 33/16; H02K 33/38; H02K 5/24; H02K 1/34; H02K 3/40; H02K 5/04; H02K 7/02; B06B 1/045
USPC ....................................... 310/15, 28
See application file for complete search history.

(56) References Cited

U.S. PATENT DOCUMENTS

| | | | | |
|---|---|---|---|---|
| 7,355,305 B2* | 4/2008 | Nakamura | ............. | H02K 33/06 310/12.03 |
| 8,288,899 B2* | 10/2012 | Park | ...................... | H02K 33/16 310/25 |
| 8,878,401 B2* | 11/2014 | Lee | ......................... | H02K 33/16 310/15 |
| 9,048,718 B2* | 6/2015 | Zhang | ..................... | H02K 33/02 |
| 9,614,425 B2* | 4/2017 | Jin | .......................... | H02K 33/12 |
| 9,748,827 B2* | 8/2017 | Dong | ...................... | H02K 33/16 |
| 9,774,236 B2* | 9/2017 | Xu | ........................... | H02K 33/16 |

(Continued)

*Primary Examiner* — Burton Mullins
(74) *Attorney, Agent, or Firm* — IPro, LLC; Na Xu

(57) ABSTRACT

A double resonance vibration motor includes a housing, vibration parts in the housing, a coil fixed in the housing, and elastic connectors to support elastically the vibration part. The vibration parts include a mass block, a first magnet group and a second magnet group installed in the mass block. The coil is opposite to the first magnetic group and the second magnetic group. The driving force generated by the first magnetic group and the coil makes the vibration motor vibrate along the first direction. The driving force of the second magnet group and the coil makes the vibration motor vibrate along the second direction. The first direction and the second direction intersect. Two different directions have respectively one resonance frequency. Two different resonant frequencies can vibrate alone or at the same time, to realize the control in different vibration directions.

7 Claims, 2 Drawing Sheets

(56) References Cited

U.S. PATENT DOCUMENTS

| | | | |
|---|---|---|---|
| 9,859,780 B2 * | 1/2018 | Wang | H02K 33/16 |
| 9,871,432 B2 * | 1/2018 | Mao | H02K 33/16 |
| 2011/0169347 A1 * | 7/2011 | Miyamoto | B06B 1/045 |
| | | | 310/12.21 |
| 2011/0181131 A1 * | 7/2011 | Pu | H02K 33/16 |
| | | | 310/28 |

* cited by examiner

DOUBLE RESONANCE VIBRATION MOTOR

FIELD OF THE INVENTION

The present disclosure is related to vibration motors, specifically related to a double resonance vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

The vibration motor currently used in portable consumer electronic products includes generally a housing, a base which forms an accommodation space with the housing, and a single vibration system fixed in the accommodation space. As one vibration system has only one natural resonant frequency, the vibration motor in such traditional structure has also only one resonance frequency. If two resonance frequencies are required in a terminal device equipped with such vibration motor, two vibration motors are needed thereby. Two vibration motors will inevitably take up more space, not in favor of minimized development trend of terminals at present.

Therefore, an improved vibration motor which can overcome the problems mentioned above is accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
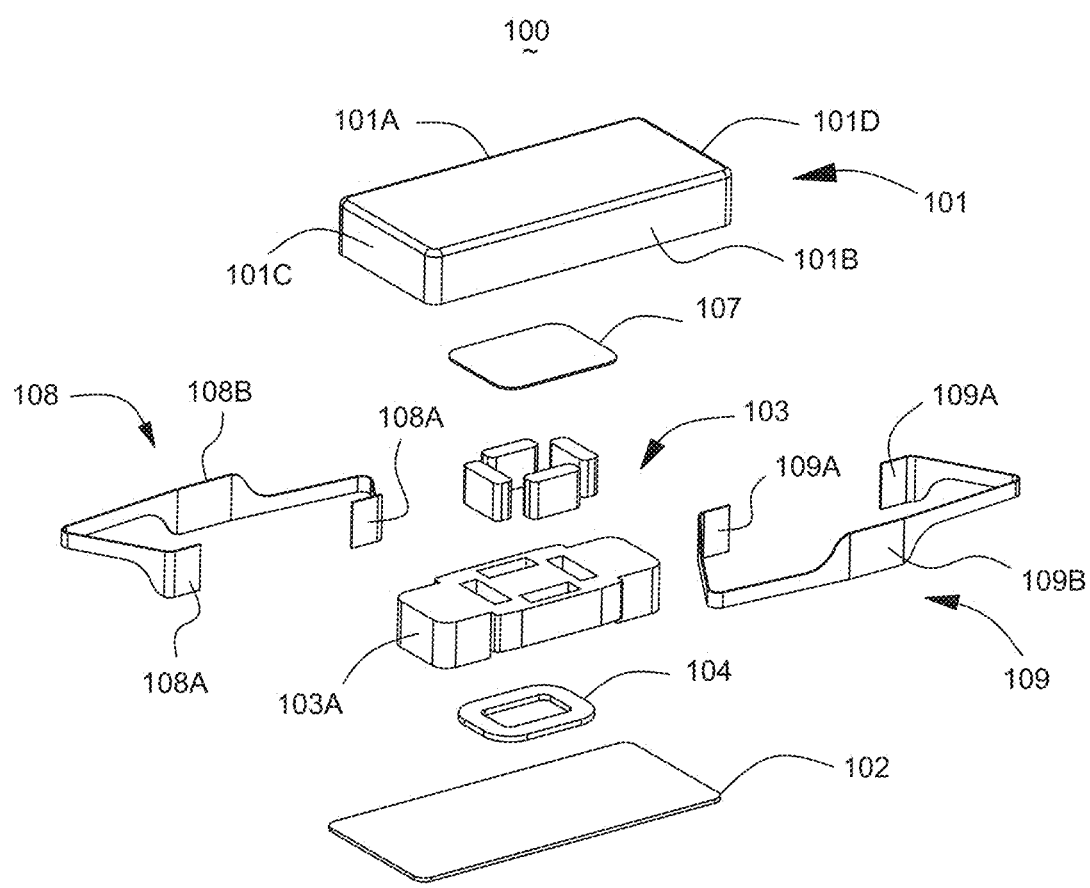
FIG. 1 is an isometric and exploded view of a double resonance vibration motor in accordance with an exemplary embodiment of the present disclosure.
Figure 2:
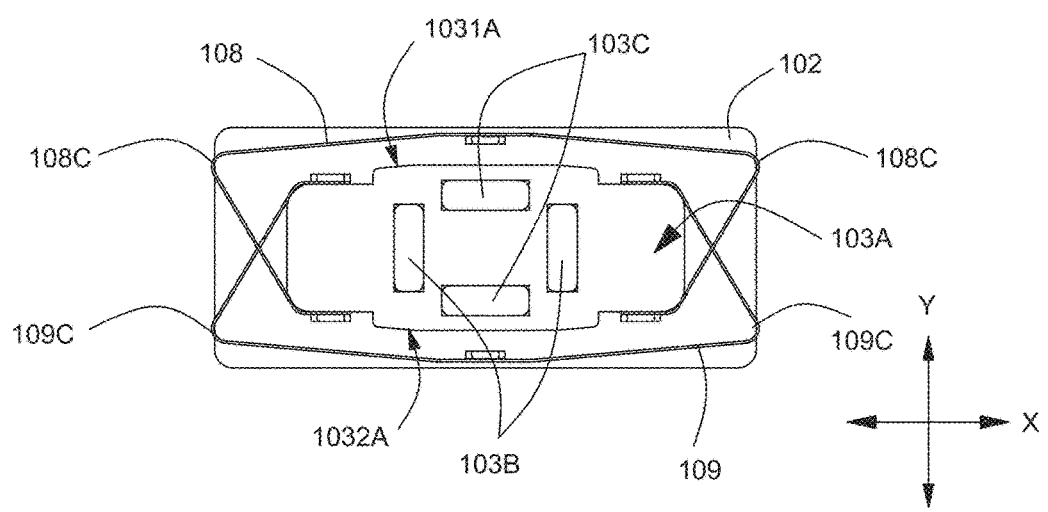
FIG. 2 is a top view of the double resonance vibration motor in FIG. 1, wherein an upper cover and a pole plate is removed.

As shown in FIGS. 1-2, a double resonance vibration motor 100, in accordance with an exemplary embodiment of the present disclosure, includes a housing, a vibration part 103 installed in the housing, a coil 104 fixed in the housing and an elastic connector to support elastically the vibration part 103 in the housing. The housing includes an upper cover 101 and a cover plate 102 which forms an accommodation space with the upper cover 101. The upper cover 101 is composed of a first side wall 101A and a second side wall 101B which are parallel and opposite to each other, as well as a third side wall 101C and a fourth side wall 101D which are connected with the first side wall 101A and the second side wall 101B. The third side wall 101C and the fourth side wall are parallel and oppose to each other.

The vibration parts 103 includes a mass block 103A, a first magnet group 103B and a second magnet group 103C installed in the mass block 103A. The first magnet group 103B includes a first pair of magnets which are opposite to each other. The second magnet group 103C includes a second pair of magnets which are opposite to each other. The vibration motor 100 also includes a pole plate 107 which covers the first magnet group 103B and the second magnet group 103C.

In this embodiment, the coil 104 is roughly rectangular and is connected from end to end, including a first side, a second side, a third side and a fourth side. The first pair of magnets are opposite respectively to the first side and the third side. The second pair of magnets are opposite respectively to the second side and the fourth side. The connecting line of the first pair of magnets and the connection line of the second pair of magnets are intersected vertically. When the coil 104 is electrified, the first direction's driving force is generated between the coil 104 and the first magnet group 103B. The second direction's driving force is generated between the coil and the second magnet group 103C. The first direction (i.e. X direction) and the second direction (i.e., Y direction) are intersected vertically. The coil 104 can be also in circular. But when the coil 104 is in roughly rectangular, when the first pair of magnets and the second pair of magnets are corresponding to four sides of the coil, the efficiency of the magnetic field is highest.

The vibration part 103 has a resonance frequency f1 in X direction and has a resonance frequency f2 in Y direction. When the coil 104 is inputted with a certain frequency signal (e.g., f1), the vibration part 103 is under stress in both X, Y directions. When the difference between f1 frequency and f2 frequency is large, the vibration amplitude of the vibration part 103 is biggest in resonant direction and the vibration sense is bigger. The vibration amplitude in disresonance direction is very small and the vibration sense can be ignored.

As mentioned earlier, when the coil 104 is inputted with f1 frequency signal, the vibration part 103 has resonant vibration in X direction. When the vibration part 103 is driven by the driving force in X direction, the vibration has a resonance frequency f1. As vibrated under the driving force in f1 frequency in Y direction at this time, the vibration amplitude is very small and the vibration sense can be ignored.

When the coil 104 is inputted with f2 frequency signal, the vibration part 103 has resonant vibration in Y direction. When the vibration part 103 is driven by the driving force in Y direction, the vibration has a resonance frequency f2. As vibrated under the driving force in f2 frequency in X direction at this time, the vibration amplitude is very small and the vibration sense can be ignored.

When the coil 104 is inputted with f1 frequency signal and f2 frequency signal at the same time, two resonant frequencies can work at the same time. There are the vibration sense of f2 frequency in X direction, also the vibration sense of f2 frequency in Y direction, not affected each other. The vibration of two directions can be combined together to realize the vibration control of different directions.

The mass block 103A includes a first side panel 1031A near the first side wall 101A and a second panel 1032A near the second side wall 101B. The elastic connectors include a first elastic connector 108 and a second elastic connector 109. The first elastic connector 108 includes a first fixing part which connects respectively both ends of the second side panel 1032A, as well as a first connecting part 108B which connects the stated two fixing part 108A. There are two bending areas 108C on the first connecting part 108B. Two bending areas 108C can be attached respectively with the third side wall 101C and the fourth side wall 101D, or kept a gap with the third side wall 101C and the fourth side wall 101D. The first connecting part 108B is fixed with the first side wall 101A. The second elastic connector 109 includes a second fixing part 109A which connects respectively both ends of the first side panel 1031A, and a second connecting part 109B which connects the stated two second fixing parts 109A. There are also two bending areas 109C on the second connecting part 109B. Two bending areas 109C can be attached respectively with the third side wall 101C and the fourth side wall 101D, or kept a gap with the third side wall 101C and the fourth side wall 101D. The second connecting part 109B is fixed with the second side wall 101B. Each elastic connector is fixed respectively with both ends of the mass block 103A. This structure can restrict displacement of the vibration part 103 in the direction vertical to vibration direction and ensure the stability of single direction vibration.

The double resonance vibration motor 100 has one resonance frequency respectively in each of two different directions. Two different resonant frequencies can vibrate alone or at the same time, so as to control the vibration in different directions. One vibration part and one voice coil only can realize double resonance. The structure is simple and the stability of vibration is high.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A double resonance vibration motor, including:
   a housing having a first side wall and a second side wall opposite to the first side wall;
   a vibration part installed in the housing, the vibration part including a mass block, a first magnet group, and a second magnet group installed in the mass block, the mass block further including a first side panel near the first side wall and a second side panel wall near the second side wall;
   a coil fixed in the housing and opposed to the first magnetic group and the second magnetic group;
   a plurality of elastic connectors for suspending the vibration part; wherein
   a driving force generated by the first magnetic group and the coil makes the vibration motor vibrate along a first direction; a driving force generated by the second magnet group and the coil makes the vibration motor vibrate along a second direction different from the first direction.

2. The double resonance vibration motor as described in claim 1, wherein the first magnet group includes a first pair of magnets which are separated and opposite to each other, the second magnet group includes a second pair of magnets which are separated and opposite to each other, and a connecting line of the first pair of magnets and a connection line of the second pair of magnets intersect.

3. The double resonance vibration motor as described in claim 2, wherein the coil is roughly rectangular and includes a first side, a second side, a third side and a fourth side, the first pair of magnets is set respectively opposite to the first side and the third side, the second pair of magnets is set respectively opposite to the second side and the fourth side.

4. The double resonance vibration motor as described in claim 1, wherein the first direction is perpendicular to the second direction.

5. The double resonance vibration motor as described in claim 1, wherein the elastic connector includes:
   a first elastic connector having a first fixing part connecting with both ends of the second side panel of the mass block, as well as a first connecting part connecting the first fixing part, the first elastic connector being connected with the first side wall; and
   a second elastic connector including a second fixing part connecting both ends of the first side panel of the mass block, as well as a second connecting part connecting the second fixing part, the second connecting part being connected with the second side wall.

6. The double resonance vibration motor as described in claim 1 further including a pole plate covering the first magnet group and the second magnet group.

7. The double resonance vibration motor as described in claim 1, wherein the housing includes an upper cover and a cover plate which forms an accommodation space with the upper cover, and the coil is fixed to the cover plate.

* * * * *